(12) United States Patent
Krig

(10) Patent No.: US 8,788,634 B2
(45) Date of Patent: Jul. 22, 2014

(54) PORTABLE DEVICE UPGRADE VIA A CONTENT TRANSFER PROTOCOL

(75) Inventor: Scott Krig, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 1223 days.

(21) Appl. No.: 12/071,990

(22) Filed: Feb. 28, 2008

(65) Prior Publication Data

US 2009/0222809 A1    Sep. 3, 2009

(51) Int. Cl.
*G06F 15/177*    (2006.01)

(52) U.S. Cl.
USPC ........................................... 709/221

(58) Field of Classification Search
USPC ........................................... 709/221
See application file for complete search history.

(56) References Cited

U.S. PATENT DOCUMENTS

| | | |
|---|---|---|
| 6,654,830 B1 | 11/2003 | Taylor et al. |
| 7,281,066 B2 | 10/2007 | Rader et al. |
| 7,536,486 B2 | 5/2009 | Sadovsky et al. |
| 7,539,990 B2 | 5/2009 | Van Garderen et al. |
| 7,558,867 B2 * | 7/2009 | Le et al. ............... 709/230 |
| 7,664,872 B2 | 2/2010 | Osborne et al. |
| 7,805,539 B2 | 9/2010 | Hara |
| 8,135,759 B2 | 3/2012 | Roy et al. |
| 2003/0208559 A1 | 11/2003 | Velline et al. |
| 2004/0015941 A1 * | 1/2004 | Sekine ............... 717/168 |
| 2005/0086384 A1 | 4/2005 | Ernst |
| 2005/0105522 A1 * | 5/2005 | Bakshi et al. ............ 370/389 |
| 2005/0158100 A1 * | 7/2005 | Yamaguchi et al. ....... 400/62 |
| 2006/0242259 A1 | 10/2006 | Vallabh et al. |
| 2006/0280185 A1 | 12/2006 | Jacobson et al. |
| 2006/0288165 A1 | 12/2006 | Rosenbloom et al. |
| 2007/0100893 A1 | 5/2007 | Sanders |
| 2007/0244924 A1 | 10/2007 | Sadovsky et al. |
| 2008/0016228 A1 | 1/2008 | Cho |
| 2008/0052698 A1 * | 2/2008 | Olson et al. ............. 717/168 |
| 2008/0117300 A1 | 5/2008 | Shin et al. |
| 2008/0209056 A1 | 8/2008 | Choi |
| 2008/0270625 A1 | 10/2008 | Chaturvedi et al. |
| 2009/0193153 A1 | 7/2009 | Thanos |
| 2009/0222571 A1 | 9/2009 | Krig |
| 2009/0222588 A1 | 9/2009 | Krig |
| 2009/0222602 A1 | 9/2009 | Krig |

OTHER PUBLICATIONS

Apple, "About the Do not disconnect and OK to disconnect screens for iPod," Sep. 20, 2007, 2 pgs.
Kolokowsky et al., "Introduction to MTP: Media Transfer Protocol", Mar. 16, 2006, Archived date for http://www.analogzone.com/iot_0328.pdf, 7 pgs.

(Continued)

*Primary Examiner* — Ryan Jakovac
(74) *Attorney, Agent, or Firm* — Sterne, Kessler, Goldstein & Fox P.L.L.C.

(57) ABSTRACT

Embodiments of the present invention provide a portable MTP framework. In an embodiment, the portable MTP framework includes an MTP communications stack and a portability layer. The portability layer decouples the MTP communications stack from the underlying platform, storage, and transport components, thereby achieving transport protocol, platform, and storage media independence. The portable MTP framework according to embodiments of the present invention includes platform-specific software components, including, for example, communications device drivers (USB, TCP/IP, etc.), a transport controller, a session handler, storage device drivers (USB drive, SD card, Hard disk, etc.), a storage controller, and a platform interface. The portable MTP framework further includes application-specific software components, including, for example, an MTP router, MTP agents, and MTP managers.

18 Claims, 25 Drawing Sheets

(56) References Cited

OTHER PUBLICATIONS

Liu et al., "Building Reliable, high-performance communication systems from components", Published Dec. 1999, 13 pgs.

Non-Final Office Action for U.S. Appl. No. 12/071,987, filed May 26, 2011, 19 pgs.
Non-Final Office Action for U.S. Appl. No. 12/071,988, filed May 26, 2011, 11 pgs.
Office Action mailed on Jun. 28, 2013, in U.S. Appl. No. 12/071,987.

* cited by examiner

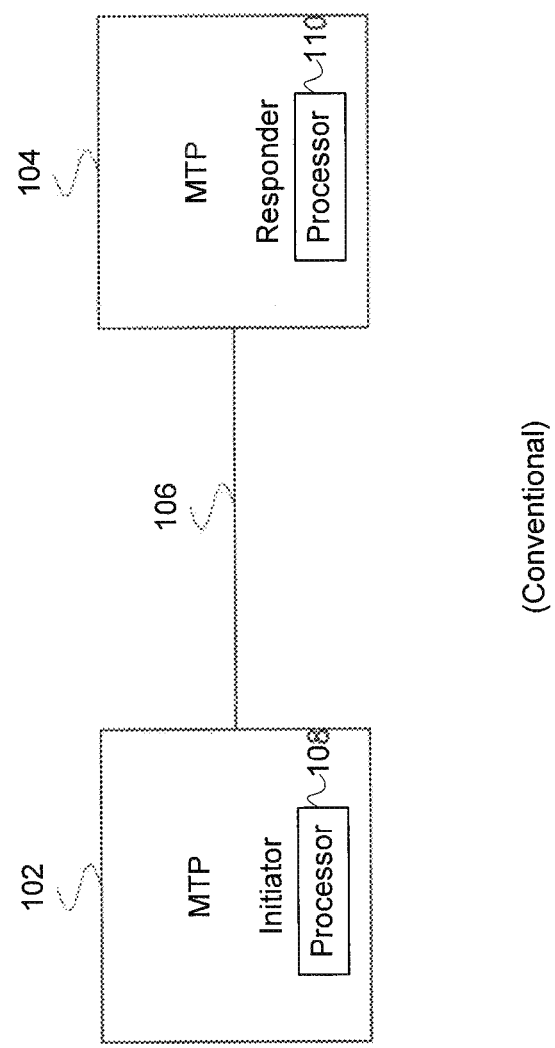
FIG. 1 (Conventional)

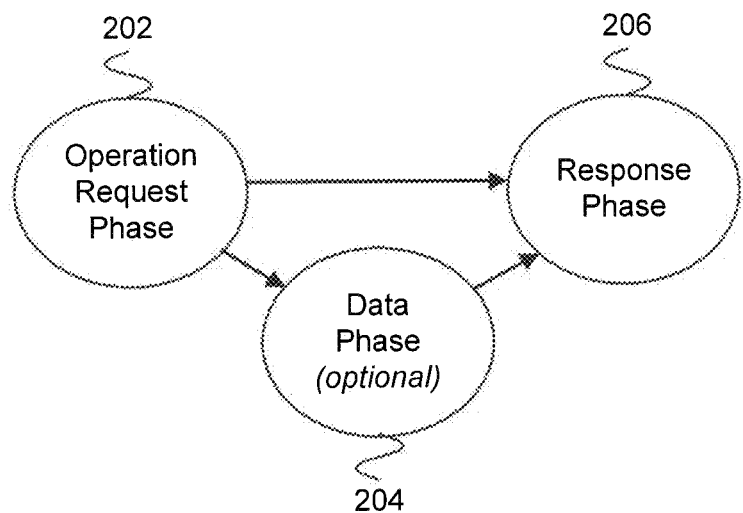
(Conventional)
FIG. 2

| Field | Size (bytes) | Datatype |
|---|---|---|
| Operation Code | 2 | UINT16 |
| SessionID | 4 | UINT32 |
| TransactionID | 4 | UINT32 |
| Parameter 1 | 4 | Any |
| Parameter 2 | 4 | Any |
| Parameter 3 | 4 | Any |
| Parameter 4 | 4 | Any |
| Parameter 5 | 4 | Any |

(Conventional)

FIG. 3

| Field | Size (bytes) | Format |
|---|---|---|
| ResponseCode | 2 | UINT16 |
| SessionID | 4 | UINT32 |
| TransactionID | 4 | UINT32 |
| Parameter 1 | 4 | Any |
| Parameter 2 | 4 | Any |
| Parameter 3 | 4 | Any |
| Parameter 4 | 4 | Any |
| Parameter 5 | 4 | Any |

(Conventional)

FIG. 4

| Field | Size (bytes) | Format |
|---|---|---|
| Event Code | 2 | UINT16 |
| SessionID | 4 | UINT32 |
| TransactionID | 4 | UINT32 |
| Parameter 1 | 4 | Any |
| Parameter 2 | 4 | Any |
| Parameter 3 | 4 | Any |

(Conventional)

FIG. 5

| Dataset field | Field order | Size (bytes) | Datatype |
|---|---|---|---|
| Standard Version | 1 | 2 | UINT16 |
| MTP Vendor Extension ID | 2 | 4 | UINT32 |
| MTP Version | 3 | 2 | UINT16 |
| MTP Extensions | 4 | Variable | String |
| Functional Mode | 5 | 2 | UINT16 |
| Operations Supported | 6 | Variable | Operation Code Array |
| Events Supported | 7 | Variable | Event Code Array |
| Device Properties Supported | 8 | Variable | Device Property Code Array |
| Capture Formats | 9 | Variable | Object Format Code Array |
| Playback Formats | 10 | Variable | Object Format Code Array |
| Manufacturer | 11 | Variable | String |
| Model | 12 | Variable | String |
| Device Version | 13 | Variable | String |
| Serial Number | 14 | Variable | String |

(Conventional)

FIG. 6

| Dataset field | Field order | Length (bytes) | Datatype |
|---|---|---|---|
| Storage Type | 1 | 2 | UINT16 |
| Filesystem Type | 2 | 2 | UINT16 |
| Access Capability | 3 | 2 | UINT16 |
| Max Capacity | 4 | 8 | UINT64 |
| Free Space In Bytes | 5 | 8 | UINT64 |
| *Free Space In Objects | 6 | 4 | UINT32 |
| Storage Description | 7 | Variable | String |
| Volume Identifier | 8 | Variable | String |

(Conventional)

FIG. 7

| Field name | Field order | Size (bytes) | Datatype | Description |
|---|---|---|---|---|
| Property Code | 1 | 2 | UINT16 | A specific ObjectPropCode identifying this property. |
| Datatype | 2 | 2 | UINT16 | This field identifies the datatype code of the property. |
| Get/Set | 3 | 1 | UINT8 | This field indicates whether the property is read-only (Get), or read-write (Get/Set).<br>0x00 Get<br>0x01 Get/Set |
| Default Value | 4 | DTS | DTS | This field identifies the value of the factory default for the property. |
| Group Code | 5 | 4 | UINT32 | This field identifies the retrieval group this property belongs to. |
| Form Flag | 6 | 1 | UINT8 | This field indicates the format of the next field.<br>0x00 None<br>0x01 Range form<br>0x02 Enumeration form<br>0x03 DateTime form<br>0x04 Fixed-length Array form<br>0x05 Regular Expression form<br>0x06 ByteArray form<br>0xFF LongString form |
| FORM | N/A | <variable> | - | This dataset depends on the Form Flag, and is absent if Form Flag = 0x00. |

(Conventional)

FIG. 8

| Step | Initiator action | Parameter 1 | Parameter 2 | Parameter 3 | Responder action |
|---|---|---|---|---|---|
| 1 | GetDeviceInfo | 0x00000000 | 0x00000000 | 0x00000000 | Send DeviceInfo dataset. |
| 2 | OpenSession | SessionID | 0x00000000 | 0x00000000 | Create ObjectHandles and StorageIDs if necessary. |
| 3 | GetObjectHandles | 0xFFFFFFFF | 0xFFFFFFFF | 0x00000000 | Send ObjectHandle array. |
| 4 | GetObjectPropSupported | ObjectFormatCode | 0x00000000 | 0x00000000 | Send ObjectPropCode array. |
| 5 | GetObjectPropDesc | ObjectProp 1 | Object Format 1 | 0x00000000 | Send ObjectPropDesc dataset. |
| 6 | Repeat step 5 for each ObjectProperty | ObjectProp n | 0x00000000 | 0x00000000 | Send ObjectPropDesc dataset. |
| 7 | GetObjectPropValue | ObjectHandle 1 | ObjectProp Code 1 | 0x00000000 | Send value of ObjectProp 1 for ObjectHandle 1. |
| 8 | Repeat step 7 for each ObjectHandle x ObjectPropCode | ObjectHandle m | ObjectProp Code n | 0x00000000 | Send value of ObjectProp *n* for ObjectHandle *n*. |
| 9 | CloseSession | 0x00000000 | 0x00000000 | 0x00000000 | Close session. |

(Conventional)

| Database ObjectHandle Change Table | | StorageID Change Table | |
|---|---|---|---|
| ObjectHandle | State | StorageID | State |
| ObjectHandle_1 | [Add]/[Change]/[Remove] | StorageID_1 | [Add]/[Change]/[Remove] |
| ... | | ... | |
| ObjectHandle_n | [Add]/[Change]/[Remove] | Storage_ID_n | [Add]/[Change]/[Remove] |

| MTP Event Name | Event Datacode |
|---|---|
| ObjectAdded | 0x4002 |
| ObjectRemoved | 0x4003 |
| StoreAdded | 0x4004 |
| StoreRemoved | 0x4005 |
| DevicePropChanged | 0x4006 |
| ObjectInfoChanged | 0x4007 |
| StoreFull | 0x400A |
| StorageInfoChanged | 0x400C |
| ObjectPropChanged | 0xC801 |
| ObjectPropDescChanged | 0xC802 |
| ObjectReferencesChanged | 0xC803 |

FIG. 19

PORTABLE DEVICE UPGRADE VIA A CONTENT TRANSFER PROTOCOL

CROSS-REFERENCE TO RELATED APPLICATIONS

The present application is related to U.S. patent application Ser. No. 12/071,987, filed Feb. 28, 2008, U.S. patent application Ser. No. 12/071,988, filed Feb. 28, 2008 and U.S. patent application Ser. No. 12/071,989, filed Feb. 28, 2008, all of which are herein incorporated by reference in their entirety.

BACKGROUND OF THE INVENTION

1. Field of the Invention

The present invention relates generally to portable device communications, and more particularly to a portable communications framework.

2. Background Art

Media Transfer Protocol (MTP) was developed as an extension to Picture Transfer Protocol (PTP) and is directed particularly to digital cameras, portable media players, and cellular phones.

One purpose of MTP is to facilitate communication with media devices that have transient connectivity and significant storage capacity. These media devices can be generally described as having intermittent or infrequent connections with a computer system or other device, and typically fulfill their primary functionality while not connected to a computer system or other device.

Another purpose of MTP is to enable command and control of these media devices, including remote invocation of device functionality, monitoring of device-initiated events, and reading/setting of device properties.

MTP is transport protocol independent. In other words, MTP objects can be transported within virtually any transport protocol, including USB (Universal Serial Bus), TCP/IP (Transmission Control Protocol/Internet Protocol), and Bluetooth, for example. MTP is also operating system and file system independent. However, conventional MTP frameworks are typically designed for specific transport, operating system, and file system configurations.

There is a need therefore for a portable MTP framework which is decoupled from the specific details of the device transport, platform, and storage systems, thereby being usable in a variety of portable devices irrespective of the supported device transport, platform, and storage.

BRIEF SUMMARY OF THE INVENTION

Embodiments of the present invention provide a portable MTP framework. In an embodiment, the portable MTP framework includes an MTP communications stack and a portability layer. The portability layer decouples the MTP communications stack from the underlying platform, storage, and transport components, thereby achieving transport protocol, platform, and storage media independence.

The portable MTP framework according to embodiments of the present invention includes platform-specific components, including, for example, communications device drivers (USB, TCP/IP, etc.), a transport controller, a session handler, storage device drivers (USB drive, SD card, Hard disk, etc.), a storage controller, and a platform interface. The portable MTP framework farther includes application-specific components, including, for example, an MTP router, MTP agents, and MTP managers.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 1 is a block diagram that illustrates the Media Transfer Protocol (MTP) communication model.

FIG. 2 is a state diagram that illustrates an MTP transaction.

FIG. 3 illustrates the data structure of an MTP Operation.

FIG. 4 illustrates the data structure of an MTP Response.

FIG. 5 illustrates the data structure of an MTP Event.

FIG. 6 illustrates the MTP DeviceInfo dataset.

FIG. 7 illustrates the MTP StorageInfo dataset.

FIG. 8 illustrates the MTP ObjectPropDesc dataset.

FIG. 9 is an example that illustrates the use of object properties in a multi-step exchange between an MTP Initiator and an MTP Responder.

FIG. 17 illustrates an exemplary database change table according to an embodiment of the present invention.

FIG. 19 illustrates example MTP events that a portable MTP framework can send to a remote PC initiator based on change tables.

The present invention will be described with reference to the accompanying drawings. Generally, the drawing in which an element first appears is typically indicated by the leftmost digit(s) in the corresponding reference number.

DETAILED DESCRIPTION OF EMBODIMENT(S)

Media Transfer Protocol (MTP) Overview

Figure 10:
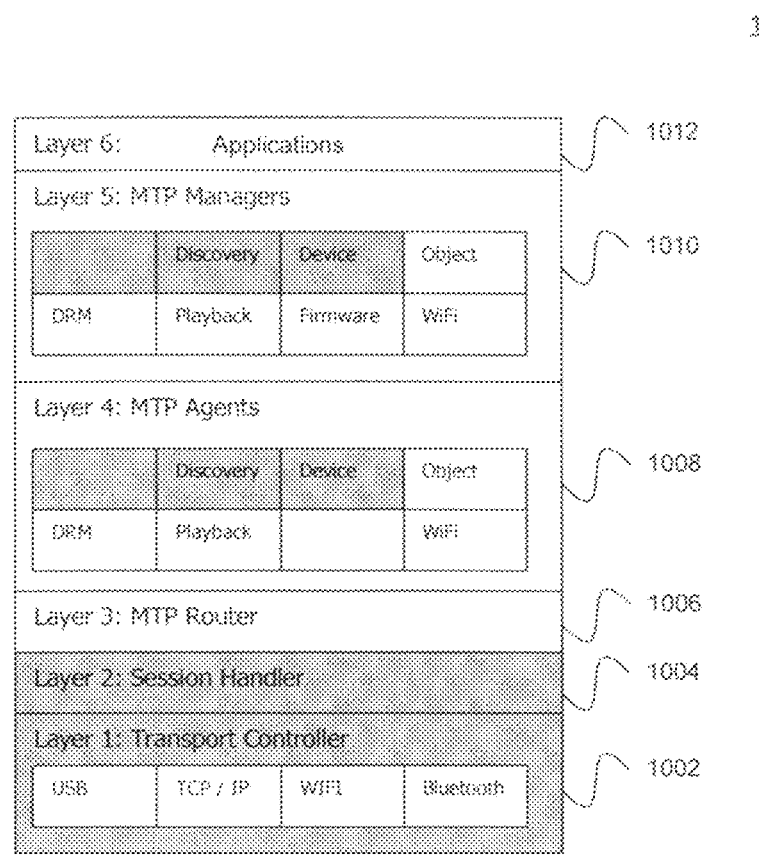
FIG. 10 is a block diagram that illustrates a portable MTP framework according to an embodiment of the present invention.

MTP was developed as an extension to Picture Transfer Protocol (PTP) and is directed particularly to digital cameras, portable media players, and cellular phones.

One purpose of MTP is to facilitate communication with media devices that have transient connectivity and significant storage capacity. These media devices can be generally described as having intermittent connections with a computer system or other device, and typically fulfill their primary functionality while not connected to a computer system or other device.

Another purpose of MTP is to enable command and control of these media devices, including remote invocation of device functionality, monitoring of device-initiated events, and reading/setting of device properties.

It is noted that when used in the context of MTP, the term "media" is used to identify any binary data and is not limited to audio/video. Examples of non-audio/video data include contacts, programs, scheduled events, and text files.

MTP follows a communication model in which MTP exchanges may only occur between two devices at a given time. FIG. 1 is a block diagram 100 that illustrates the MTP communication model. A first device 102 acts as an MTP Initiator, and a second device 104 acts as an MTP Responder. MTP Initiator 102 and MTP Responder 104 are linked by a communications link 106 that supports MTP communication. MTP Initiator 102 may be, for example, a host computer, and MTP Responder 104 may be, for example, a hand-held device. MTP Initiator 102 and MTP Responder 104 each includes suitable logic, circuitry and/or code, as illustrated by processors 108 and 110 in FIG. 1, to enable transfer of information via MTP.

MTP initiator 102 initiates actions with MTP Responder 104 by sending operations to MTP Responder 104 over communications link 106. In response to operations, MTP Responder 104 sends responses to MTP Initiator 102. Typically, MTP Responder 104 does not initiate actions but may send unsolicited events to MTP Initiator 102.

Data flow in MTP is unidirectional. When an operation is initiated, data flows from MTP Initiator 102 to MTP Responder 104. Conversely, data flows from MTP Responder 104 to MTP Initiator 102 when a response is being sent. As such, bi-directional flow occurs over multiple sequential operations/responses.

Generally, communication between MTP Initiator 102 and MTP Responder 104 is performed using MTP transactions, where an MTP transaction includes up to three phases: an Operation Request Phase, an optional Data Phase, and a Response Phase. A transaction ID is associated with data being communicated in each phase to identify the data as relating to the same MTP transaction. Generally, the MTP Initiator generates transaction IDs, incremented by one for each successive transaction.

A state diagram illustrating an MTP transaction is shown in FIG. 2. As shown, an MTP transaction begins in an Operation Request Phase 202, which includes initiating a transaction by transmitting an Operation dataset from the MTP Initiator to the MTP Responder. The Operation dataset identifies the operation being invoked by the MTP Initiator, the context in which it is to be executed, and includes a limited set of parameters. FIG. 3 illustrates the data structure of an Operation dataset. As shown, the Operation dataset includes an Operation Code field, which identifies the operation being initiated. MTP supports a variety of operations, including, for example, operations related to objects at the MTP Responder (e.g., GetObject, MoveObject, etc.), operations related to the MTP Responder device (ResetDevice, PowerDown, etc.), and operations related to the device storage (e.g., FormatStore, GetStorageInfo, etc.). A complete description of MTP Operations and their usages can be found in the MTP specification, which is incorporated herein by reference in its entirety.

Further, as shown in FIG. 3, the Operation dataset may include a Session ID, a Transaction ID, and up to five parameters.

The Session ID identifies an MTP session within which the operation exists, which represents a communication state in which a connection has persisted between the MTP Initiator and the MTP Responder and a state has been maintained. Within a given session, the MTP Responder state does not change without alerting the MTP Initiator to the change. It is noted that certain operations do not require a SessionID, as they may be executed within or without an active session.

The Transaction ID, as described above, identifies the transaction initiated by the operation.

The operation parameters include information required to execute the operation. The contents of these parameters depend on the Operation Code field and/or the context in which the operation is being used.

Referring back to FIG. 2, an optional Data Phase 204 may follow the Operation Request Phase 202. Typically, the Data Phase 204 is used to send any data that cannot be transferred using the parameters of the Operation dataset during the Operation Request phase. The type of data sent in the Data Phase 204 also depends on the operation. For example, for certain operations, the data consists of datasets defined by the MTP specification. For others, the data is binary data exchanged for the purpose of storage on the MTP Responder device.

Whether or not a Data Phase 204 follows the Operation Request Phase 202 depends on the operation sent in the Operation Request Phase 202. A typical example involves the sending of objects from an MTP Initiator to an MTP Responder, which includes the MTP Initiator sending a SendObjectInfo operation (which includes an ObjectInfo dataset in its data field) in the Operation Request phase, followed by a SendObject operation (which includes the object in binary data in its data field) in the Data Phase. The ObjectInfo dataset provides transfer context to the MTP Responder, allowing it to allocate appropriate resources for the transfer.

It is noted that data flow in the Data Phase 204 can be from the MTP Initiator to the MTP Responder, or vice versa.

An MTP transaction terminates with a Response Phase 206, as shown in FIG. 2. The Response Phase 206 includes the MTP Responder transmitting a Response dataset to the MTP Initiator in response to the operation. FIG. 4 illustrates the data structure of an MTP Response. As shown, a Response dataset may include a Response Code, a Session ID, a Transaction I), and up to five parameters.

The Response code identifies the result of the operation request. Response code options depend on the operation request and/or the response context. The Session ID, Transaction ID, and the parameters serve substantially similar functions as described above with respect to the Operation dataset.

As described above, MTP transactions are initiated only by the MTP Initiator. As such, a mechanism is needed to enable the MTP Responder to proactively transmit information or alerts to the MTP Initiator. This is accomplished using Events in MTP, which are typically one-way transmissions from the MTP Responder to the MTP Initiator (the MTP Initiator may also send events).

Events in MTP are not intended to convey information beyond the notification of a change of a given state at the MTP Responder. As such, events are communicated to the MTP Initiator in the form of an event dataset, which includes a minimum of required information to describe the event, including an event code, for example. When the event code alone is not sufficient to convey all information related to the event, the receiving device (the MTP Initiator) is generally made to probe the sending device (the MTP Responder) for more information after receiving the initial event dataset. FIG. 5 illustrates the data structure of an MTP Event. As shown, an Event dataset may include an Event Code, a Session ID, a Transaction ID, and up to three parameters. The Event Code field identifies the event being indicated by the dataset. A listing of event codes and their meanings can be found in the MTP specification.

Device representation in MTP is designed such that the capabilities and properties of a device can be exploited to enable a number of features, including rich user interface (UI) representation of a connected device, matching of content to device capabilities, meta-functionality on objects, device state awareness, and device command and control. These features are implemented by a combination of a device describing dataset (DeviceInfo Dataset) and flexible and extensible device properties. FIG. 6 illustrates the MTP DeviceInfo dataset. The DeviceInfo dataset is used to provide a description of the device and can be obtained using the GetDeviceInfo operation. As shown in FIG. 6, the DeviceInfo dataset includes, among other fields, a Device Properties Supported field, which identifies by code all device properties that the device supports in its current functional mode. The device properties identify settings or state conditions of the device and are not linked to any data objects on the device. Device properties may be read-only or read-write, and are defined by their DevicePropDesc dataset, which can be retrieved with the GetDevicePropDesc operation. The DevicePropDesc dataset provides, for example, the device property value, read/write settings, a default value, and, where relevant, any restrictions on allowed property values.

MTP devices generally include a substantial amount of persistent data storage, either within the device or on removable storage. Storage in MTP is identified using a 32-bit unsigned integer, called a StorageID. The StorageID is subdivided into two halves, with the most significant half identifying a physical storage location and the least significant half identifying a logical partition of the physical storage. Storage description is done using the StorageInfo dataset, which is illustrated in FIG. 7. As shown, the StorageInfo dataset includes, among others, a Storage Type field and a Filesystem Type field. The StorageType field identifies the physical nature of the storage described by the StorageInfo data set, which may be a fixed Read-Only Memory (ROM), removable ROM, Fixed Random Access Memory (RAM), or Removable RAM. The Filesystem Type field identifies the logical file system, including the file-naming or directory structure conventions in used on the storage.

MTP is file system independent. As such, MTP uses objects, which are abstract containers, to encapsulate media or other structured data. Examples of objects include, for example, image files, audio/video files, contacts, calendar/task items, and generic binary files.

An MTP object includes four parts: the object's binary data, the ObjectInfo dataset, object properties, and object references. The ObjectInfo dataset is a standard fixed dataset available for every object, which provides basic information about the object. The ObjectInfo dataset was originally defined in PTP and has been largely replaced in MTP by Object Properties.

Object properties provide a flexible and extensible way of representing object metadata. Object properties serve to not only describe the actual content of the object but also to indirectly indicate the various structures a particular object format can take. Further, object properties provide a mechanism for exchanging object-describing metadata separate from the objects themselves, thereby permitting the rapid enumeration of large storages, regardless of the file system. Object properties are defined by an ObjectPropDesc dataset, which is illustrated in FIG. 8.

To support object properties, a device will be required to support the following operations: GetObjectPropsSupported, GetObjectPropValue, and GetObjectPropDesc. Operations support of a device is listed in the DeviceInfo dataset of the device. A device that further supports the setting of object properties supports the SetObjectPropValue operation.

FIG. 9 is an example that illustrates the use of object properties in a multi-step exchange between an MTP Initiator and an MTP Responder. As shown, the exchange begins in step 1, which includes an initiator action represented by the GetDeviceInfo operation and a corresponding Responder action represented in the SendDeviceInfo response. Note that step 1 can be performed before a session is opened, which is done in step 2.

In step 3, the Initiator initiates a GetObjectHandles operation, in response to which the Responder sends the ObjectHandle array.

In step 4, the Initiator initiates a GetObjectPropSupported operation, to which the Responder responds by sending the ObjectPropCode array, which includes codes of object properties supported.

In steps 5 and 6, the Initiator requests descriptions of the object properties by repeatedly invoking the GetObjectPropDesc operation for all object handles received in step 3. In response to each GetObjectPropDesc operation, the Responder responds by sending the corresponding ObjectPropDesc dataset. Subsequently, in steps 7 and 8, the Initiator requests the values of the object properties by repeatedly invoking the GetObjectPropValue for object handles received in step 3. In response to each GetObjectPropValue operation, the Responder responds by sending the value of the corresponding object property.

Finally, in step 9, the Initiator initiates a CloseSession operation, which closes the session.

Mobile MTP Framework Architecture

MTP is transport protocol independent. In other words, MTP objects can be transported within virtually any transport protocol, including USB, TCP/IP, and Bluetooth, for example. MTP is also operating system and file system independent. However, conventional MTP frameworks are typically designed for specific transport, operating system, and file system configurations.

There is a need therefore for a portable MTP framework which is decoupled from the specific details of the device transport, platform, and storage systems, thereby being usable in a variety of portable devices irrespective of the supported device transport, platform, and storage.

Embodiments of the present invention provide a portable MTP framework. In an embodiment, the portable MTP framework includes an MTP communications stack and a portability layer. The portability layer decouples the MTP communications stack from the underlying platform, storage, and transport components, thereby achieving transport protocol, platform, and storage media independence.

The portable MTP framework according to embodiments of the present invention includes platform-specific software components, including, for example, communications device drivers (USB, TCP/IP, etc.), a transport controller, a session handler, storage device drivers (USB drive, SD card, Hard disk, etc.), a storage controller, and a platform interface. The portable MTP framework further includes application-specific software components, including, for example, an MTP router, MTP agents, and MTP managers.

FIG. 10 is a block diagram that illustrates a portable MTP framework 1000 according to an embodiment of the present invention. As shown, portable MTP framework 1000 implements a layered communications stack, which includes a Transport Controller layer 1002, a Session Handler layer 1004, an MTP Router layer 1006, an MTP Agents layer 1008, an MTP Managers layer 1010, and an Applications layer 1012.

Transport Controller layer 1002 provides an Application Programming Interface (API) to abstract a plurality of different transport protocols, including USB, TCP/IP, WIFI, and Bluetooth. Session Handler layer 1004 provides coarse-level packet inspection and session management functionalities. MTP Router layer 1006 provides application-specific packet routing functionalities. MTP Agents layer 1008 provides application-specific fine-level packet inspection and management functionalities. MTP Managers layer 1010 provides application-specific MTP logic. MTP Applications layer 1012 include end user applications. Further description of the different layers and components of portable MTP framework 1000 will be further described below.

Portable MTP framework 1000 can be implemented within a portable MTP device, and enables the device to act as either an MTP Initiator or an MTP Responder. When the portable device acts as an MTP Responder (as is primarily the case), the MTP stack responds to Operations and Events sent by an MTP Initiator, such as a Windows Media Player application, for example, running on a computer attached to the device. The MTP stack may also initiate asynchronous MTP Events for reporting specific events at the portable device.

Figure 11:
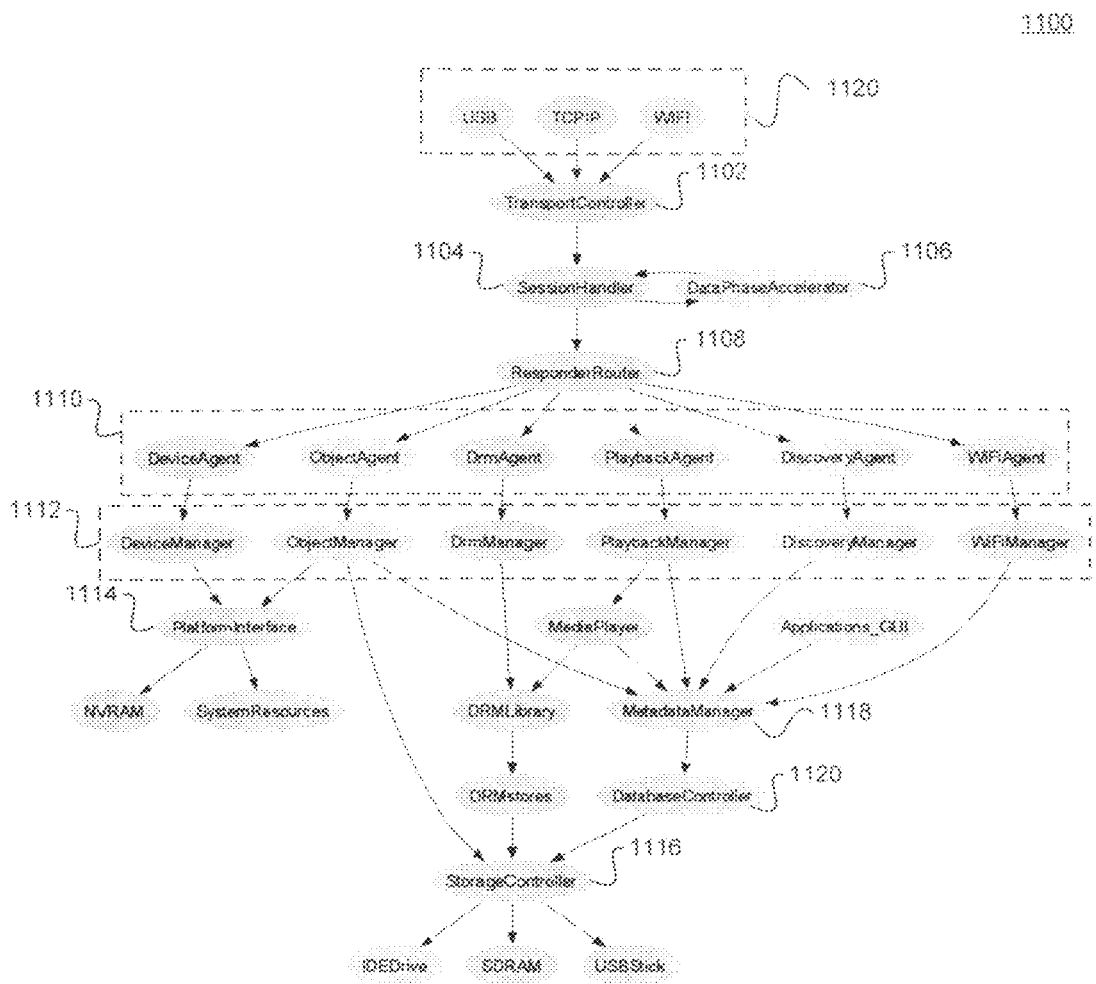
FIG. 11 is a graph diagram that illustrates a portable MTP framework according to an embodiment of the present invention.

FIG. 11 is a graph diagram that provides a more detailed illustration of a portable MTP framework 1100 according to an embodiment of the present invention. Data flow relationships between the different layers and/or components of portable MTP framework 1100 are represented using directional arrows. It is noted that portable MTP framework 1100 is shown implemented within an MTP Responder in FIG. 11. As would be understood by a person skilled in the art based on the teachings herein, portable MTP framework 1100 can also be readily implemented within an MTP Initiator.

As shown in FIG. 11, portable MTP framework 1100 includes a Transport controller 1102, a Session handler 1104, a Responder Router 1108, a plurality of MTP agents 1110, and a plurality of MTP managers 1112. These components correspond substantially to Transport Controller layer 1002, Session Handler layer 1004, MTP Router layer 1106, MTP Agents layer 1008, and MTP Managers layer 1010, respectively, of portable MTP framework 1000 described above. Portable MTP framework 1100 further includes a DataPhaseAccelerator component 1106, which makes part of the Session Handler layer and communicates with Session Handler 1104.

Portable MTP framework 1100 further provides a plurality of APIs, including, for example, a Platform Interface component 1114, a Storage Controller component 1116, and a Metadata Manager component 1118.

Detailed description of components of portable MTP Framework 1110 will now be provided.

Transport Controller

As described above, Transport controller 1102 is a platform software component, which serves to abstract the specific details of the transport protocol used (e.g., USB, TCP/IP, etc.) from upper layers of portable MTP framework 1100. In other words, Transport controller 1102 enables MTP objects to be communicated over various transport mechanisms in a manner transparent to the upper layers of the MTP stack. In an embodiment, Transport controller 1102 hides the details of interfacing with the underlying transport by providing a common API with a common set of transport data structures to the upper layers of portable MTP framework 1100.

In an embodiment, Transport controller 1102 supports multiple simultaneous transports and provides interfaces for three separate simultaneous channels per transport, including a control channel, a payload channel, and an event channel. The control channel is used to carry MTP control information, including Operation, Event, and Response Datasets. The payload channel is used for the transfer of payload data, including structured metadata and binary media file data. The event channel is used to send asynchronous events from the MTP Responder to the an MTP Initiator.

Session Handler

Session handler 1104 provides an interface between upper layers of portable MTP framework 1100 and Transport Controller 1102. In particular, session handler 1104 provides a coarse-grained packet inspection function of incoming control data to ensure that valid Operation, Event, and Response datasets are received before passing them to the upper layers of portable MTP framework 1100. Subsequently, session handler 1104 routes the incoming control data to either Responder Router 1108 (in the case of an MTP Responder as illustrated in FIG. 11) or to appropriate MTP Initiator code (in the case of an MTP Initiator).

In addition, session handler 1104 provides an API for sending MTP Operation, Event, and Response datasets over a control channel of the transport. The API can be used by either MTP Initiator code or MTP Responder code. As such, session handler 1104 supports both MTP Responder and MTP Initiator roles. Further, session handler 1104 provides an API for sending and receiving payload data, including metadata datasets and media files, over a payload channel of the transport.

Session handler 1104 further provides an API for optimized sending and receiving of payload data between storage drivers and the transport within portable MTP framework

1100. This API is referred to herein as DataPhaseAccelerator and will be described in further detail below.

Session handler 1104 further provides session management functionality, including management of the OpenSession and CloseSession operations. Generally, one session is allowed for incoming traffic and one session is allowed for outgoing traffic (i.e., one session per Initiator role and one session per Responder role).

Figure 12:
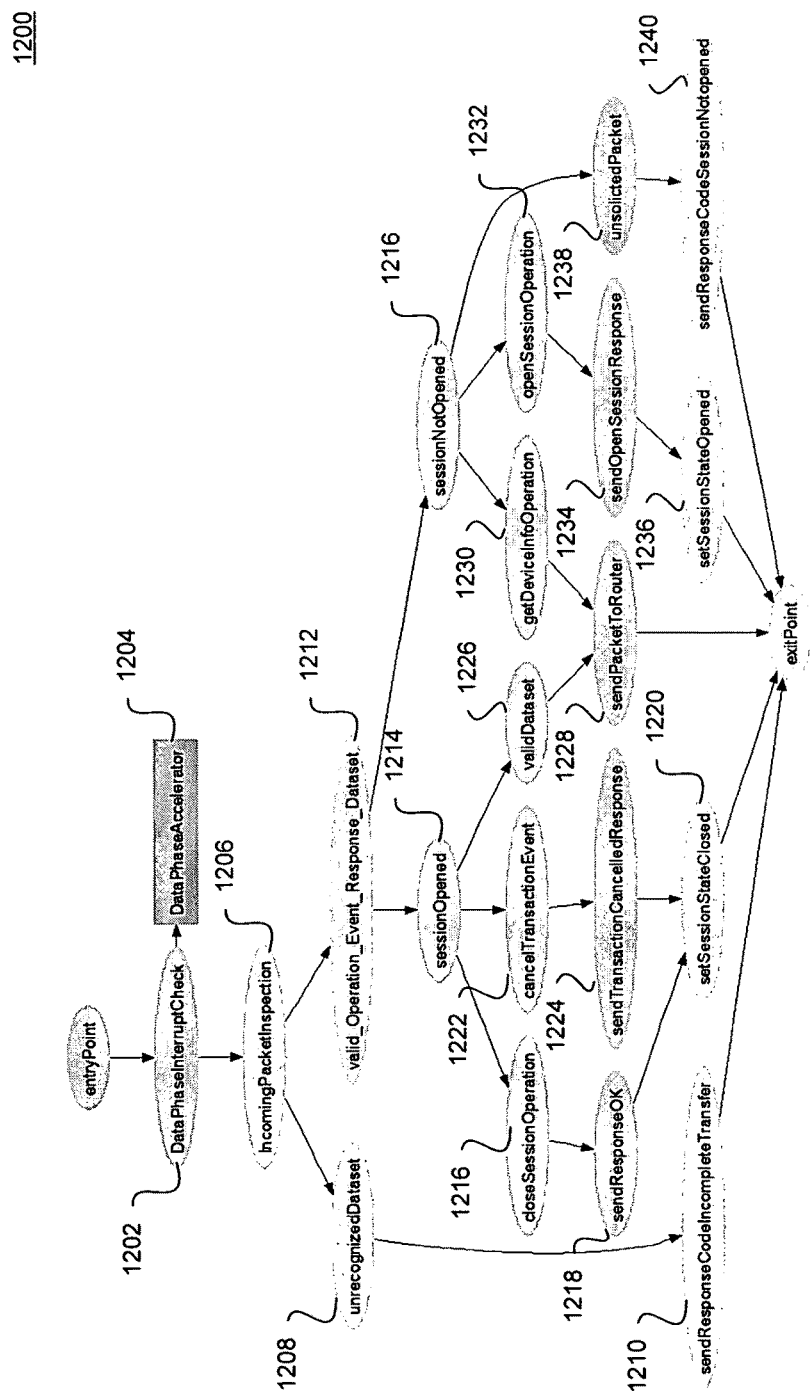
FIG. 12 is a state machine diagram that illustrates control logic flow within a session handler according to an embodiment of the present invention.

FIG. 12 is a state machine diagram 1200 that illustrates the control logic flow within a session handler according to an embodiment of the present invention. As shown, the state machine diagram 1200 begins in state 1202, which includes checking if a DataPhaseInterrupt is received. A DataPhaseInterrupt indicates the beginning of the data phase in an MTP transaction.

If a DataPhaseInterrupt is received, the state machine proceeds to state 1204, which includes invoking the DataPhase-Accelerator API. The DataPhaseAccelerator then controls the details of the data transfer between the storage systems and the transport. Otherwise, the state machine proceeds to state 1206, which includes inspecting the incoming packet to determine whether it is a valid MTP Operation, Event, or Response dataset.

If the incoming packet is an unrecognized dataset, the state machine proceeds to state 1208 and then to state 1210, which includes sending a response code to indicate incomplete transfer. If, on the other hand, the incoming packet is recognized as an MTP packet, the state machine proceeds to state 1212 and then to either state 1214 or state 1216 depending on whether or not a session is currently open.

If a session is currently open, the state machine proceeds to state 1214. Subsequently, if the incoming packet is a closeSession operation, the state machine proceeds to close the session by moving into states 1216, 1218, and 1220, successively. Similarly, the state machine proceeds to close the session if the incoming packet is a cancelTransaction event, by moving into states 1222, 1224, and 1220, successively. If the incoming packet, however, is a valid dataset, the state machine proceeds to send the incoming packet to the router in states 1226 and 1228.

If no session is currently open, the session handler may also be able to handle the incoming packet if it is one of certain operations which do not require an open session. As shown in FIG. 12, the incoming packet may be a GetDeviceInfo operation, which the session handler manages by forwarding it to the router (which routes the incoming packet to the appropriate device) in states 1230 and 1228. The incoming packet may also be an OpenSession operation, which the session handler manages by proceeding through states 1232, 1234, and 1236 successively, to send an Open Session response and set the Session state as open. On the other hand, if the incoming packet is an unsolicited packet that does not match any of the two operations just described, the state machine proceeds through states 1238 and 1240 to send a response code indicating that the session is not opened.

As described above, the session handler provides a data transfer optimization API to optimize data transfer between an Initiator (e.g., Windows Media Player running on a computer) and a Responder (e.g., portable device). This includes, among other features, optimizing data transmission between the storage devices and the transport layer. In an embodiment, as illustrated in FIG. 11, this is achieved by implementing a common API (DataPhaseAccelerator API 1106) shared by Transport Controller 1102 and Storage Controller 1116 (will be described further below), which manages all the underlying details of interfacing the transport and storage layers, to allow for maximum data transfer performance.

DataPhaseAccelerator API 1106 can be used to transfer the binary portion of large media files when a GetObject/SendObject operation is invoked by the Initiator to retrieve/send an object from/to the Responder.

Figure 14:
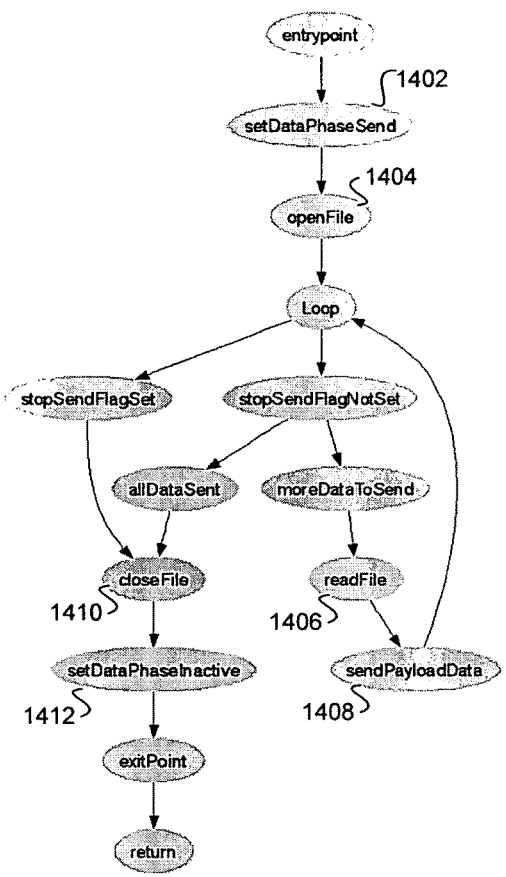
FIG. 14 is a state machine diagram that illustrates the data send functionality of the DataPhaseAccelerator API according to an embodiment of the present invention.

FIG. 14 is a state machine diagram 1400 that illustrates the data send functionality of DataPhaseAccelerator API 1106 according to an embodiment of the present invention. As shown, state machine 1400 begins in state 1402, which includes setting a DataPhaseSend flag, before proceeding in state 1404 to open the file associated with the object being sent. Subsequently, a loop, which includes reading the opened file in state 1406 and sending payload data in state 1408, is entered until a stop send flag is set or all data in the file has been sent. When either loop exit condition is true, state machine 1400 proceeds to state 1410, which includes closing the open file. State machine 1400 then proceeds to set the data phase inactive in state 1412, before returning to the session handler.

Figure 15:
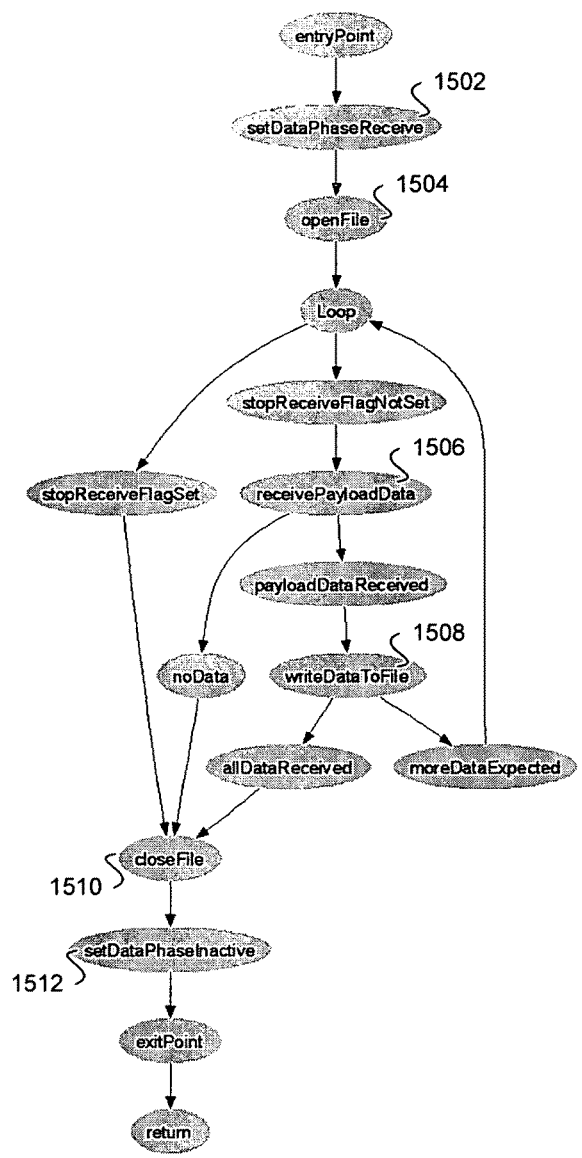
FIG. 15 is a state machine diagram that illustrates the data receive functionality of the DataPhaseAccelerator API according to an embodiment of the present invention.

FIG. 15 is a state machine diagram 1500 that illustrates the data receive functionality of DataPhaseAccelerator API 1106 according to an embodiment of the present invention. As shown, state machine 1500 begins in state 1502, which includes setting a DataPhaseReceive flag, before proceeding in state 1504 to open a file associated with the object being received. Subsequently, a loop, which includes receiving payload data in state 1506 and writing the received data to the opened file in state 1508, is entered until a stop receive flag is set, all data has been received, or the received payload data contains no data. When either loop exit condition is true, state machine 1500 proceeds to state 1510, which includes closing the open file. State machine 1500 then proceeds to set the data phase inactive in state 1510, before returning to the session handler.

Figure 13:
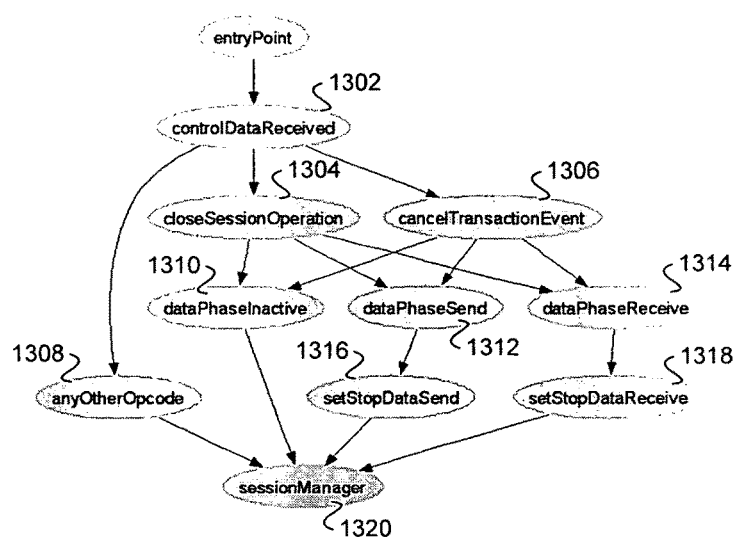
FIG. 13 is a state machine diagram that illustrates the data phase interrupt handling functionality of the DataPhaseAccelerator API according to an embodiment of the present invention.

DataPhaseAccelerator API 1106 also handles any interrupts to data transfer independently from Session Handler 1104. This is described in FIG. 13, which illustrates a state machine diagram 1300 of the DataPhaseAccelerator interrupt handling functionality. As shown, state machine 1300 begins in state 1302, which includes receiving control data. If the control data received is a CloseSession operation, state machine 1300 proceeds to state 1304. Subsequently, if the data phase is inactive, state machine 1300 proceeds to state 1310, before returning to the session handler in state 1320. However, if the data phase is active, which means that either a data send or a data receive is in progress, state machine 1300 will proceed to either state 1312 or state 1314, as shown in FIG. 13. State machine 1300 will then proceed to either state 1316 or state 1318 to stop the data send/receive, before returning to the session handler in state 1320. On the other hand, if the control data received is a CancelTransaction event, state machine 1300 proceeds to state 1306. Subsequently, state machine 1300, as shown in FIG. 13, will behave in a similar manner as described above with respect to the CloseSession operation. If the control data received is any other operation/event code, state machine 1300 will proceed to state 1308 and then return to the session handler in step 1320.

State machine 1300 can be implemented in various hardware, software, and/or firmware topologies, including sub-embedded software running on an embedded processor, for example.

Storage Controller

Storage controller 1116 of portable MTP framework 1100 is a platform software component, which provides an API to abstract the interfacing with supported device storage systems. As shown in FIG. 11, for example, storage controller 1116 provides an interface with an IDE (Integrated Drive Electronics) Drive, an SDRAM (Synchronous Dynamic Random Access Memory) memory, and a USB memory stick.

In an embodiment, abstracting the interfacing with storage systems includes abstracting file operations (e.g., open, read, write, delete, close, etc.) and partition mounting of storage partitions including, among others, DRM (Digital Rights Management) stores, metadata databases, and removable storage. Generally, storage controller 1116 discovers storage partitions through Platform interface 1114, which in certain platforms retrieves partitions information from NVRAM (non-volatile RAM).

In another embodiment, storage controller 1116 further manages notification events for hot-plug and hot-unplug removable storage, calls appropriate code to update the database (e.g., add objects), and initiates events via MTP as needed. For example, storage controller 1116 initiates MTP events such as StoreAdded/StoreRemoved to indicate the addition/removal of a storage system.

Also, as described above, storage controller 1116 supports data transmission optimization for data transfer with Transport Controller 1102, using DataPhaseAccelerator API 1106.

In a further embodiment, storage controller 1116 manages the enumeration and un-enumeration of media files on fixed and/or removable storage partitions.

Platform Interface

Platform interface 1114 of portable MTP framework 1100 is a platform software component, which provides several APIs to support the portability of platform specific resources. For example, platform interface 1114 provides a portability API to abstract platform resources and libraries, including file systems and persistent storage (e.g., NVRAM). In an embodiment, the portability API includes a run-time API that supports file system abstraction (e.g., open, read, write, etc.) of persistent storage. Platform interface 1114 further provides a user notification interface API, which allows portable MTP framework 1100 to provide error and status messages to an application for display in a GUI.

Figure 16:
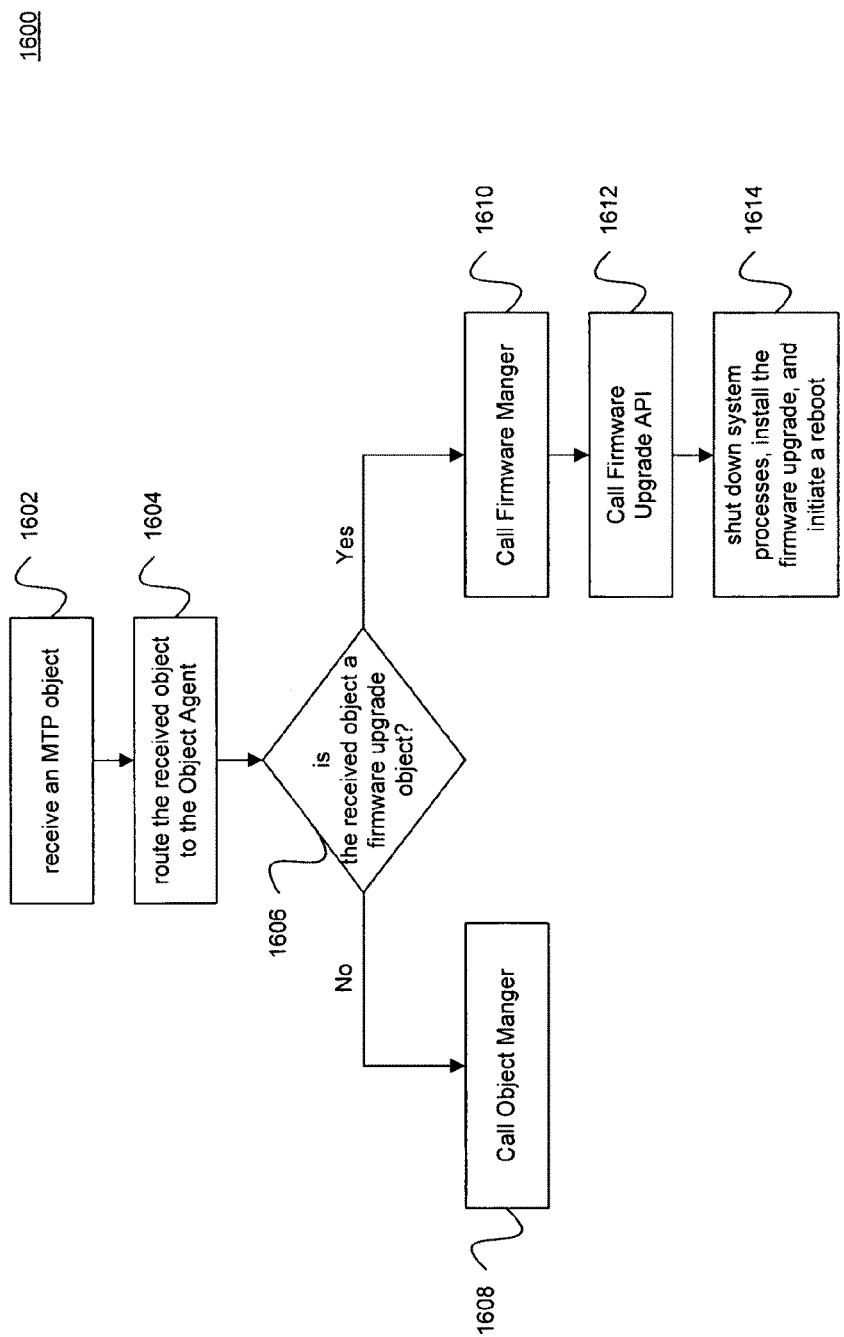
FIG. 16 is a process flowchart of a method of performing firmware upgrade using MTP according to an embodiment of the present invention.

In another aspect, platform interface 1114 provides a Firmware Upgrade API, which enables a firmware upgrade cycle of the device via MTP. FIG. 16 is a process flowchart 1600 that illustrates a method of performing firmware upgrade using MTP according to an embodiment of the present invention. Process 1600 begins in step 1602, which includes receiving an MTP object. In an embodiment, step 1602 is achieved via the SendObject MTP operation.

Step 1604 includes routing the received object to the Object Agent of portable MTP Framework 1100. As shown in FIG. 11, the Object Agent is an MTP agent located in the Agents layer 1110 of portable MTP framework 1100.

Step 1606 includes determining if the received object is a firmware upgrade object. In an embodiment, step 1606 includes checking the received object for the "undefined firmware" property code, which is a property code associated with a firmware upgrade object in MTP. In other embodiments, step 1606 includes checking a specified file type or file name associated with a firmware upgrade object.

If the received object is not a firmware upgrade object, process 1600 proceeds to step 1608, which includes calling the Object Manager to appropriately handle the received object.

On the other hand, if the received object is determined to be a firmware upgrade object in step 1606, process 1600 proceeds to step 1610, which includes calling the Firmware Manager to initiate the firmware upgrade process. Note that the Firmware Manager (not shown in FIG. 11) is a unique manager in MTP in that it requires no corresponding MTP agent.

Subsequently, step 1612 includes calling the Firmware Upgrade API of platform interface 1114, by passing it the received object. When the Firmware Upgrade API receives the object, it proceeds in step 1614 to shut down all system processes, install the firmware upgrade, and initiate a reboot of the device.

Note that the firmware upgrade cycle modifies the MTP DeviceInfo dataset of the device to reflect the upgraded firmware information. Generally, the new firmware information is stored in the NVRAM of the device, and will be reported to the initiator (e.g., Windows Media Player on PC) via a SendDeviceInfo response.

Metadata Manager and Database Controller

Portable MTP framework 1100 manages MTP metadata via a Metadata manager 1118 and a Database controller 1120.

Metadata manager 1118 provides an API that can be used by native application components (e.g., Media Player, application GUIs, etc.) as well as MTP stack components (e.g., Object manager, Playback manager, etc.) of portable MTP framework 1100, to manage metadata. In an embodiment, Metadata manager 1118 uses Database controller 1120, which is a database interface code, to control the database.

Database controller 1120 provides primitive database operations, including an API abstraction for storing and retrieving MTP Object Properties and Object Associations in a database. In an embodiment, Database controller 1120 provides SQL database operations.

As noted above, the MTP database can be accessed via Metadata manager 1118 by either MTP stack components and native GUI applications (illustrated in FIG. 11 as Applications GUI). However, the behavior of portable MTP framework 1100 is different with respect to the MTP database based on the operating mode of the framework. According to embodiments of the present invention, portable MTP framework 1100 can operate in the following modes:

Slave mode: the portable MTP framework runs as a stand-alone application for the duration of the transport connection to the host PC. While in Slave mode, the portable MTP framework takes over the portable device GUI and displays a "connected" screen, which does not provide any GUI features. The portable device as such acts like a mass-storage device. Further, the portable MTP framework has exclusive access to the MTP database, which can only be modified (e.g., objects added and/or removed) by the remote PC initiator application such as Windows Media Player, for example. Any addition or removal of removal storage devices is ignored by the portable MTP framework during Slave mode.

Native GUI mode: the portable MTP framework does not run during this mode. Instead, the native GUI application runs and may allow removable storage devices and objects to be added and removed from the portable device. Since the portable MTP framework does not run in this mode, it will not know when objects or storage devices are added or removed. A mechanism to ensure that the portable MTP framework discovers these changes and reports them to the initiator application when it returns to slave mode is described further below.

Shared mode: the portable MTP framework operates alongside the native GUI application on the portable device. The portable MTP framework does not take over the GUI in this mode. Further, the MTP database is a shared resource between the portable MTP framework and the native GUI application. In an embodiment, the portable MTP framework acts as a server of the GUI application.

Mass-storage slave mode: the portable device acts as a removable storage device for a remote PC until the connection is stopped.

During this mode, the portable MTP framework does not run. As such, it is for the native GUI application to notify the portable MTP framework of any objects which have been added/removed from the portable device while in this mode.

As described above, in certain operating modes, the native GUI application may modify the database while the portable MTP framework is not running. These changes need to be reported to the remote PC initiator. Accordingly, a mechanism is needed to notify the portable MTP framework of any changes made to the database when the portable MTP framework returns to Slave mode.

According to an embodiment of the present invention, this is achieved using Change Tables, which are tables created and updated by Database controller 1120, every time the native GUI application accesses database controller 1120 via metadata manager 1118 to reflect changes to objects or storage. FIG. 17 illustrates an exemplary database change table according to an embodiment of the present invention. As shown, the database change table includes listings of changes to objects and to storages.

Figure 18:
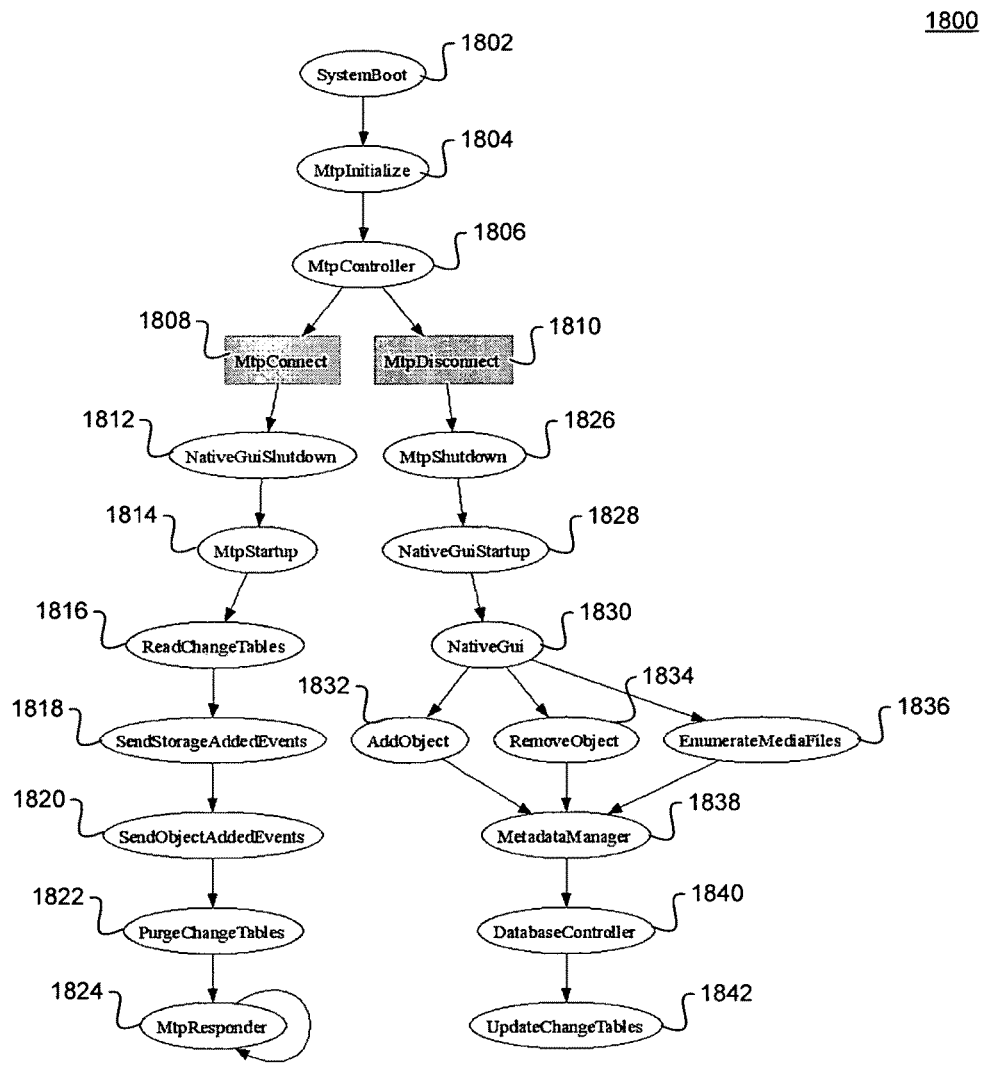
FIG. 18 is a state machine diagram that illustrates the usage of database change tables.

In an embodiment, change tables are maintained transparently in database controller 1120 for all database transactions. However, they are only used during startup of the portable MTP framework. For example, upon entering Slave mode, the change tables are processed by the portable MTP framework and appropriate events are sent to the remote PC initiator. The change tables are then be deleted. FIG. 18 is a state machine diagram 1800 which illustrates the usage of database change tables. As shown, state machine diagram 1800 begins with the initialization of the portable MTP framework in states 1802, 1804, and 1806. Subsequently, state machine 1800 proceeds to either state 1808 or state 1810 depending on whether or not the portable device is connected to the remote PC initiator.

If the portable device is connected to the remote PC initiator, state machine 1800 proceeds to state 1812, which includes shutting down the native GUI application, and then to state 1814, which includes starting the portable MTP framework in Slave mode. Subsequently, state machine 1800 proceeds to reading the change tables in state 1816, and sending object events in state 1818 and storage events in state 1820. Then, state machine 1800 proceeds to state 1822, which includes purging the change tables, before returning control to MTP Responder Router in state 1824. FIG. 19 illustrates example MTP events that the portable MTP framework may send to a remote PC initiator based on the change tables.

On the other hand, if the portable device is not connected to the remote PC initiator, state machine 1800 proceeds to state 1826, which includes shutting down the portable MTP framework, and then to state 1828, which includes starting up the native GUI application. The portable MTP framework thus enters into the native GUI mode in state 1830. During this mode, as described above, the native GUI application may access the database to add objects (via state 1832), remove objects (via state 1834), or to enumerate media files (via state 1836). As shown, the native GUI application accesses the database via metadata manager 1118 in state 1838, which in turn uses database controller 1116 in state 1840. Throughout this operating mode, as described above, database controller 1116 maintains changes to the database in change tables, as illustrated in state 1842.

Accordingly, the above described mechanism allows the creation of an audit trail of database changes when the portable MTP framework is shut down, which can be communicated to the remote PC initiator as soon as the portable MTP framework is restarted. In other words, this enables an automatic synchronization mechanism via MTP of a shared database between the portable device and the remote PC initiator.

MTP Router, Agents, and Managers

As shown in FIG. 11, portable MTP framework 1100 includes a responder router 118, a plurality of MTP agents 1110, and a plurality of MTP managers 1112.

Responder router 1108 performs the functions of 1) routing received MTP Operations and Events to an appropriate agent of MTP agents 1110; and 2) returning MTP Responses to Transport controller 1102 on behalf of MTP agents 1110.

MTP agents 1110 and MTP managers 1112 are designed to operate in a paired fashion as shown in FIG. 11. Generally, MTP agents 1110 deal with MTP protocol-specific issues (e.g., packing and unpacking MTP packets) on behalf of MTP managers 1112. MTP agents 1110 can be initiator agents or responder agents. Since portable devices are primarily used as MTP Responders, the majority of agents in portable MTP framework 1100 are responder agents. However, portable MTP framework 1100 can also be designed to be implemented within an initiator according to the present invention.

MTP managers 1112 deal with application-specific issues such as interfacing with the GUI application and the database. As with agents, MTP managers 1112 can be initiator or responder agents. As shown in FIG. 11, MTP managers 1112 access Platform interface 1114, Database Controller 1120, Storage Controller 1116, and the DRM library as needed.

Example Use Cases

Various example use cases are provided in this section in the form of sequence diagrams to illustrate the operation of and interaction between different components of the portable MTP framework. These example use cases are provided for the purpose of illustration and are not limiting of possible operations, interactions, and/or functions allowed by the various components of the portable framework.

Figure 20:
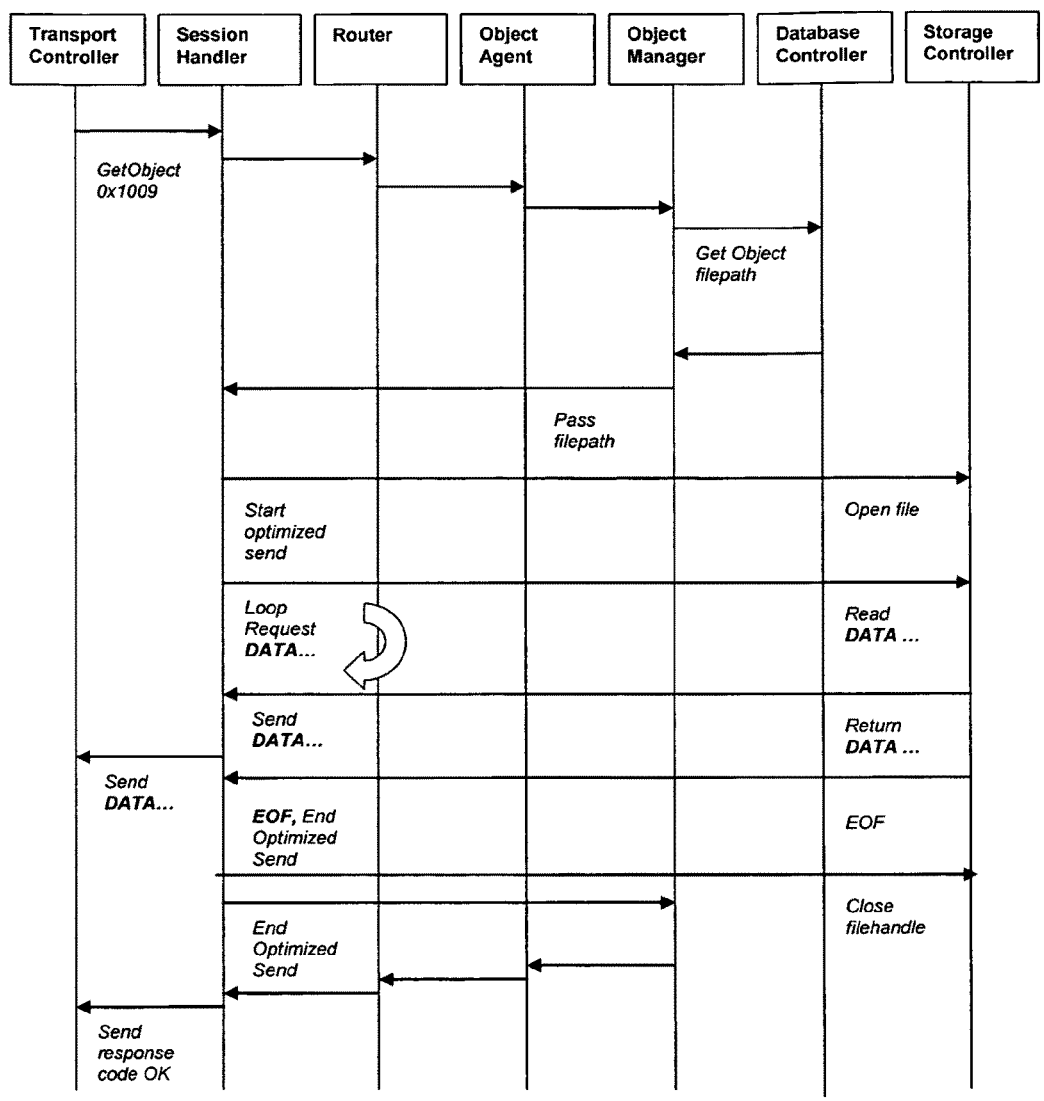
FIG. 20 is a sequence diagram that illustrates the setup of an optimized data transmission session between the session handler and the storage controller in a portable MTP framework, to send a media file from a portable device to a remote PC initiator.
Figure 21:
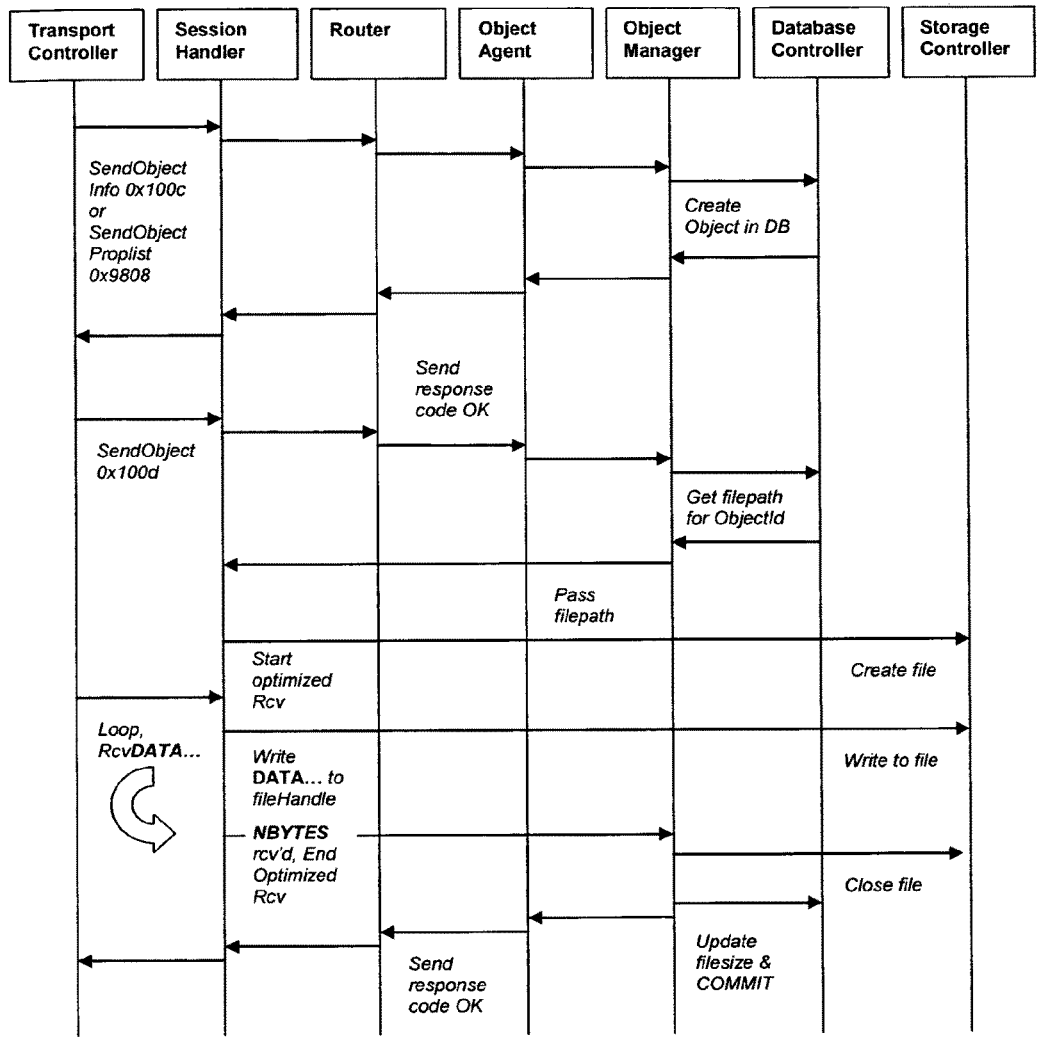
FIG. 21 is a sequence diagram that illustrates the setup of an optimized data transmission session between the session handler and the storage controller in a portable MTP framework, to receive a media file from a remote PC initiator at the portable device.

FIG. 20 is a sequence diagram 2000 that illustrates the setup of an optimized data transmission session between the session handler and the storage controller of the portable framework, to send a media file from a portable device to a remote PC initiator. Conversely, FIG. 21 is a sequence diagram 2100 that illustrates the setup of an optimized data transmission session between the session handler and the storage controller of the portable framework, to receive a media file from a remote PC initiator at the portable device. As shown in FIG. 21, two MTP events can be used to create in the database the object to be received, namely SendObjectInfo or SendObjectProplist.

Figure 22:
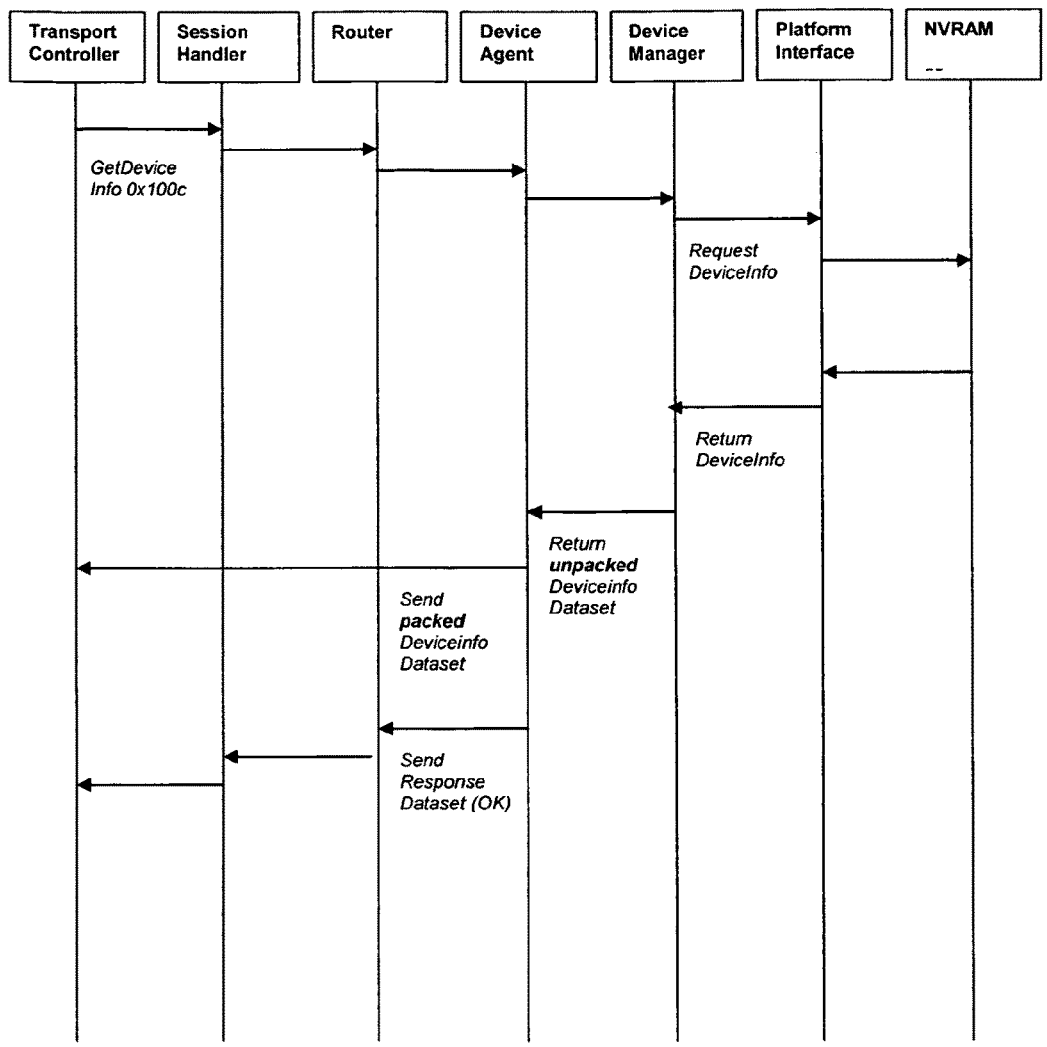
FIG. 22 is a sequence diagram that illustrates the responding of a portable device to a GetDeviceInfo MTP operation from a remote PC initiator according to an embodiment of the present invention.

FIG. 22 is a sequence diagram 2200 that illustrates the responding of a portable device to a GetDeviceInfo MTP operation from a remote PC initiator according to an embodiment of the present invention. As shown, the responder router routes the received MTP operation to the device agent, which passes it to the device manager. The device manager then accesses the NVRAM via the platform interface to retrieve the device information. Subsequently, the device manager returns the DeviceInfo dataset unpacked to the device agent. The device agent packs the DeviceInfo dataset to generate an MTP response, before passing it to the router.

Figure 23:
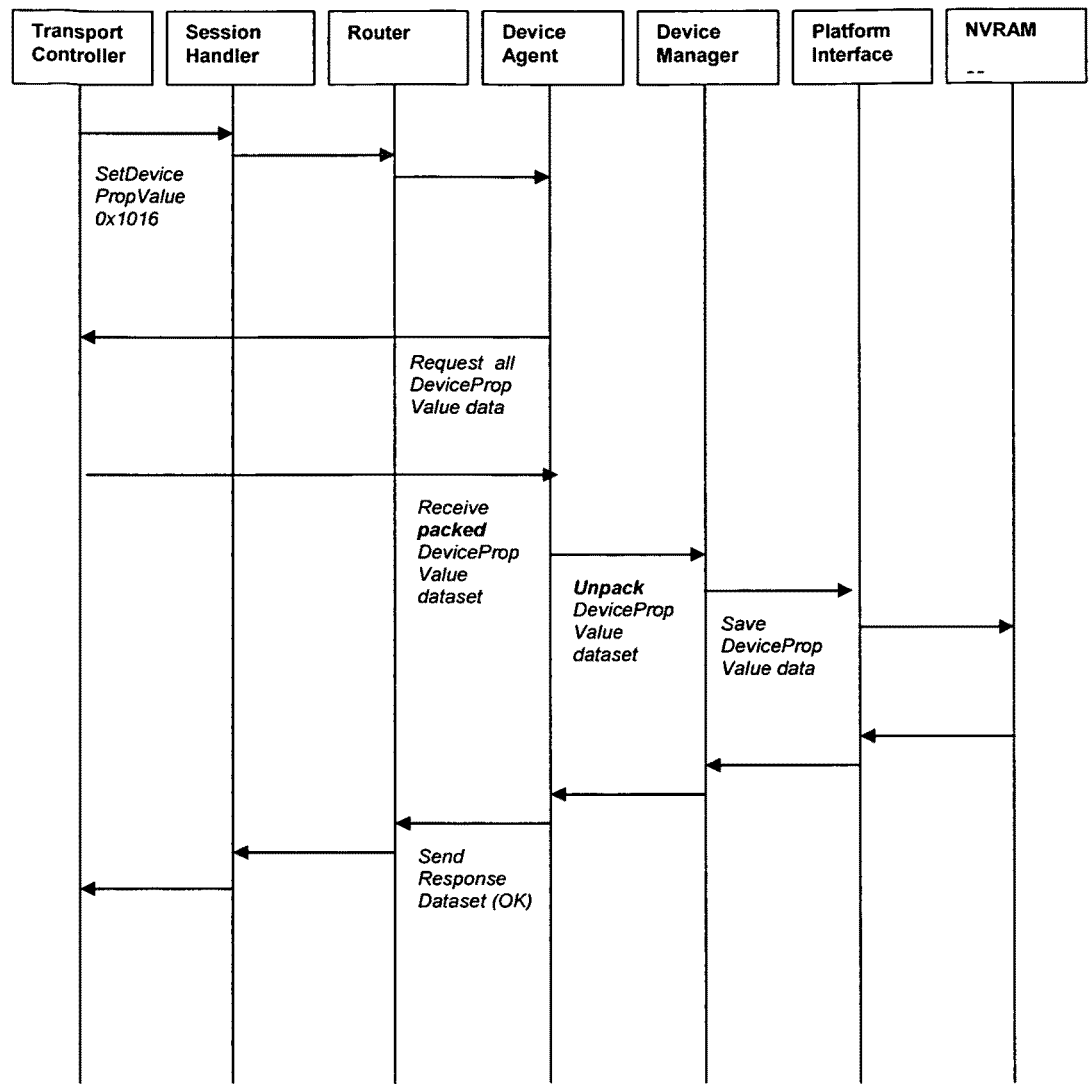
FIG. 23 is a sequence diagram that illustrates the responding of a portable device to a SetDevicePropValue MTP operation from a remote PC initiator according to an embodiment of the present invention.

FIG. 23 is a sequence diagram 2300 that illustrates the responding of a portable device to a SetDevicePropValue MTP operation from a remote PC initiator according to an embodiment of the present invention. As shown, the received MTP operation is again routed to the device agent, which then requests all of the DevicePropValue data. When the requested data is received, the device agent proceeds to unpack it and passes it to the device manager. The device manager then accesses the NVRAM via the platform interface to save the received device property value data.

Figure 24:
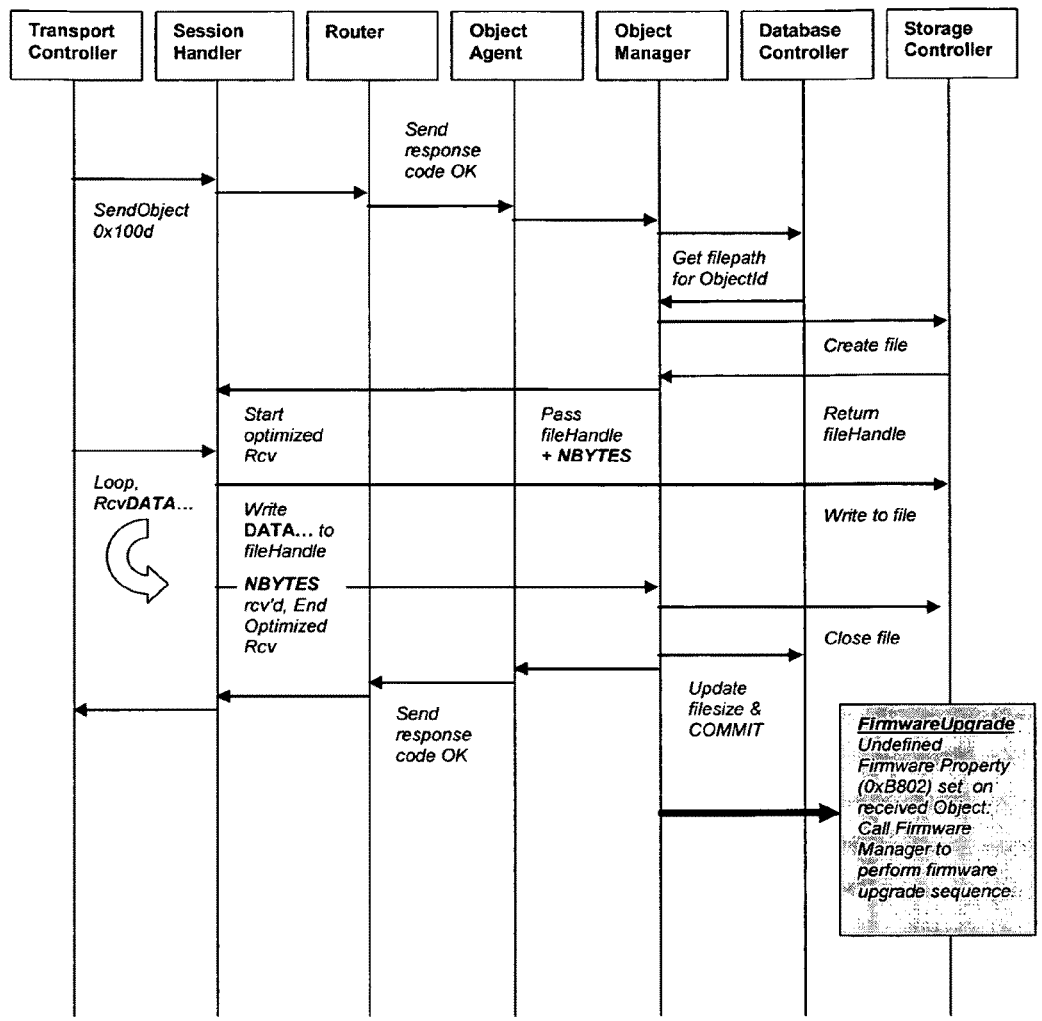
FIG. 24 is a sequence diagram that illustrates the firmware upgrade cycle according to an embodiment of the present invention.

FIG. 24 is a sequence diagram 2400 that illustrates the firmware upgrade cycle enabled by the portable framework according to an embodiment of the present invention. The firmware upgrade cycle is described with respect to FIG. 16 above.

Example Computer System Implementation

The present invention may be implemented using hardware, software or a combination thereof and may be implemented in one or more computer systems or other processing systems.

Figure 25:
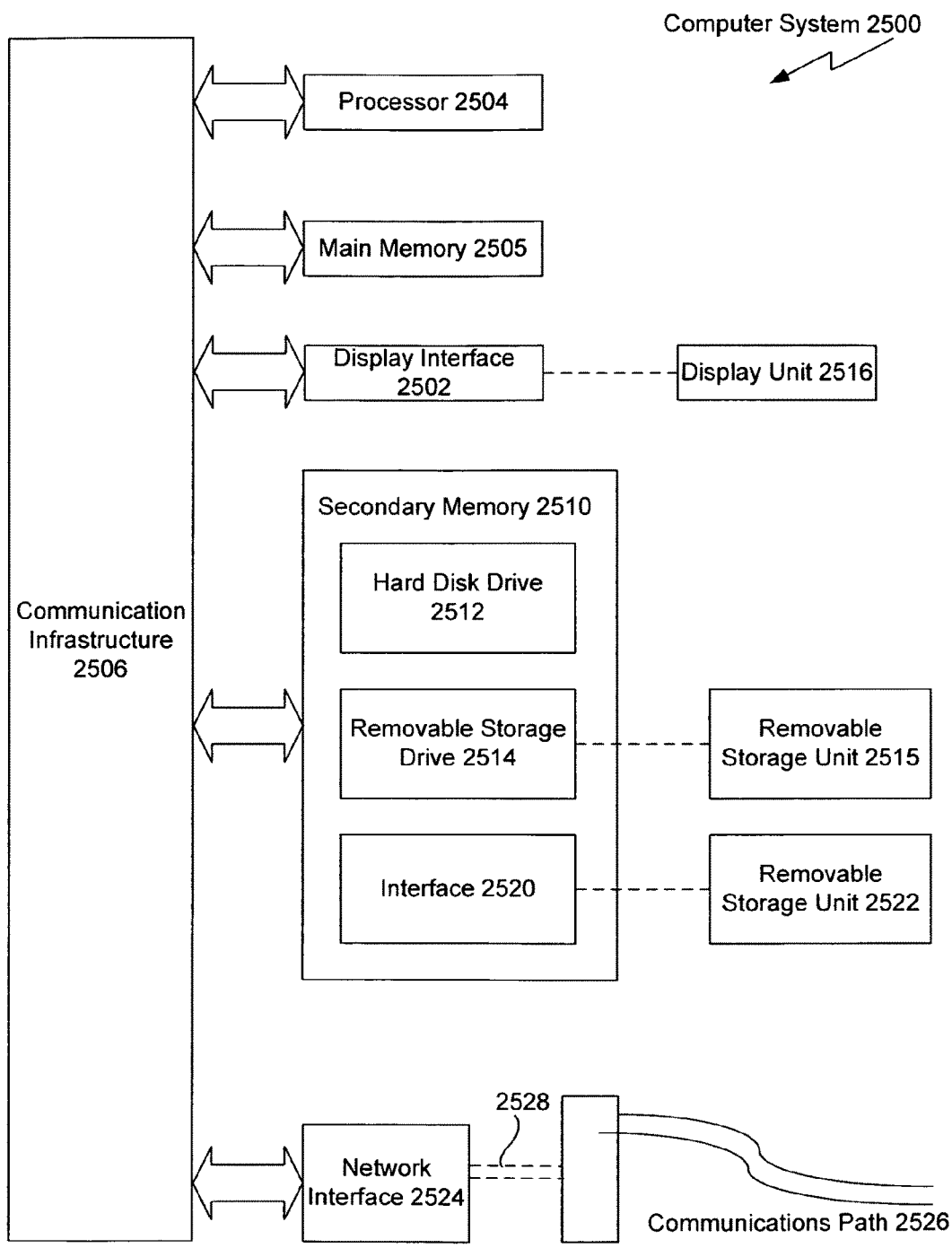
FIG. 25 is an example computer system useful for implementing components of the present invention.

An example computer system 2500 useful for implementing components of the present invention is shown in FIG. 25.

Computer system 2500 includes one or more processors, such as processor 2504. Processor 2504 is connected to a communication infrastructure 2506 (e.g., a communications bus, cross over bar, or network). Various software embodiments are described in terms of this exemplary computer system. After reading this description, it will become apparent to a person skilled in the relevant art(s) how to implement the invention using other computer systems and/or architectures.

Computer system 2500 can include a display interface 2502 that forwards graphics, text, and other data from communication infrastructure 2506 (or from a frame buffer not shown) for display on display unit 2516.

Computer system 2500 also includes a main memory 2505, preferably random access memory (RAM), and may also include a secondary memory 2510. Secondary memory 2510 may include, for example, a hard disk drive 2512 and/or a removable storage drive 2514, representing a floppy disk drive, a magnetic tape drive, an optical disk drive, etc. Removable storage drive 2514 reads from and/or writes to a removable storage unit 2515 in a well known manner. Removable storage unit 2515 represents a floppy disk, magnetic tape, optical disk, etc. which is read by and written to by removable storage drive 2514. As will be appreciated, removable storage unit 2515 includes a computer usable storage medium having stored therein computer software and/or data.

In alternative embodiments, secondary memory 2510 may include other similar devices for allowing computer programs or other instructions to be loaded into computer system 2500. Such devices may include, for example, a removable storage unit 2515 and an interface 2520. Examples of such may include a program cartridge and cartridge interface (such as that found in video game devices), a removable memory chip (such as an erasable programmable read only memory (EPROM), or programmable read only memory (PROM)) and associated socket, and other removable storage units 2515 and interfaces 2520, which allow software and data to be transferred from removable storage unit 2515 to computer system 2500.

Computer system 2500 may also include a communications interface 2524. Communications interface 2524 allows software and data to be transferred between computer system 2500 and external devices. Examples of communications interface 2524 may include a modem, a network interface (such as an Ethernet card), a communications port, a Personal Computer Memory Card International Association (PCM-CIA) slot and card, etc. Software and data transferred via communications interface 2524 are in the form of signals 2528 which may be electronic, electromagnetic, optical or other signals capable of being received by communications interface 2524. These signals 2528 are provided to communications interface 2524 via a communications path (e.g., channel) 2526. This channel 2526 carries signals 2528 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 2514, a hard disk installed in hard disk drive 2512, and signals 2528. These computer program products provide software to computer system 2500.

Computer programs (also referred to as computer control logic) are stored in main memory 2505 and/or secondary memory 2510. Computer programs may also be received via communications interface 2524. Such computer programs, when executed, enable computer system 2500 to perform the features of the present invention, as discussed herein. In particular, the computer programs, when executed, enable processor 2504 to perform the features of the present invention. Accordingly, such computer programs represent controllers of computer system 2500.

In an embodiment where the invention is implemented using software, the software may be stored in a computer program product and loaded into computer system 2500 using removable storage drive 2514, hard drive 2512 or communications interface 2524. The control logic (software), when executed by processor 2504, causes processor 2504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; and flash memory devices;

Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A computer program product comprising a non-transitory computer useable medium having computer program logic recorded thereon, the computer program logic, when executed by a processor, causes the processor to perform a firmware upgrade, according to a method, on a portable device that implements a portable Media Transfer Protocol (MTP) framework capable of transporting media files to and from the portable device, the method comprising:
- receiving, by a transport controller of the portable MTP framework, an MTP object from a remote computer attached to said portable device;
- routing, by a router module of the portable MTP framework, said received MTP object to an MTP object agent of the portable MTP framework;
- determining, by the MTP object agent, that said received MTP object includes a firmware upgrade object;
- calling, from the MTP object agent, a firmware manager of the portable MTP framework ; and
- calling a firmware upgrade application programming interface (API) of a platform interface of the portable MTP framework using said received MTP object as an argument.

2. The computer program product of claim 1, wherein the method further comprises establishing a control channel between said portable device and said remote computer.

3. The computer program product of claim 2, wherein said control channel carries control data according to MTP.

4. The computer program product of claim 1, wherein determining that said received MTP object includes a firmware upgrade object comprises:
- inspecting said received MTP object for validity in accordance with MTP; and
- verifying one or more of (a) a property code; (b) a file type; and (c) a file name associated with said received MTP object.

5. The computer program product of claim 4, wherein said received object includes a firmware upgrade object when one or more of said property code, file type, and file name respectively match a firmware upgrade object property code, file type, and file name.

6. The computer program product of claim 1, wherein the method further comprises:
- shutting down all system processes on said portable device;
- installing an upgrade contained in said received MTP object; and
- re-booting said portable device.

7. The computer program product of claim 6, wherein the method further comprises:
- modifying an MTP device information dataset associated with said portable device to reflect said firmware upgrade.

8. The computer program product of claim 6, wherein the method further comprises:
- storing information associated with said firmware upgrade in a non-volatile random access memory (NVRAM) of said portable device.

9. The computer program product of claim 6, wherein the method further comprises:
- sending an event to said remote computer, wherein said event includes a device information dataset associated with said portable device.

10. A method for performing a firmware upgrade on a portable device that implements a portable Media Transfer Protocol (MTP) framework capable of transporting media files to and from the portable device, comprising:
- receiving, by a transport controller of the portable MTP framework, an MTP object from a remote computer attached to said portable device;
- routing, by a router module of the portable MTP framework said received MTP object to an MTP object agent of the portable MTP framework;
- determining, by the MTP object agent, that said received MTP object includes a firmware upgrade object;
- calling, from the MTP object agent, a firmware manager of the portable MTP framework; and
- calling a firmware upgrade application programming interface (API) of a platform interface of the portable MTP framework using said received MTP object as an argument.

11. The method of claim 10, further comprising establishing a control channel between said portable device and said remote computer.

12. The method of claim 11, wherein said control channel carries control data according to MTP.

13. The method of claim 10, wherein said determining step comprises:
- inspecting said received MTP object for validity in accordance with MTP; and
- verifying one or more of (a) a property code; (b) a file type; and (c) a file name associated with said received MTP object.

14. The method of claim 13, wherein said received MTP object includes a firmware upgrade object when one or more of said property code, file type, and file name respectively match a firmware upgrade object property code, file type, and file name.

15. The method of claim 10, further comprising:
- shutting down all system processes on said portable device;
- installing an upgrade contained in said received MTP object; and
- re-booting said portable device.

16. The method of claim 15, further comprising:
- modifying an MTP device information dataset associated with said portable device to reflect said firmware upgrade.

17. The method of claim 15, further comprising:
- storing information associated with said firmware upgrade in non-volatile random access memory (NVRAM) of said portable device.

18. The method of claim 15, further comprising:
- sending an event to said remote computer, wherein said event includes a device information dataset associated with said portable device.

* * * * *